United States Patent
Liang et al.

(10) Patent No.: US 11,828,273 B2
(45) Date of Patent: Nov. 28, 2023

(54) COMPACT PLASMA THRUSTER

(71) Applicants: The Board of Trustees of the Leland Stanford Junior University, Stanford, CA (US); The Australian National University, Canberra (AU)

(72) Inventors: Wei Liang, Stanford, CA (US); Luke C. Raymond, Redwood City, CA (US); Juan M. Rivas Davila, Palo Alto, CA (US); Roderick Boswell, Canberra (AU); Christine Charles, Canberra (AU)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 341 days.

(21) Appl. No.: 16/496,531

(22) PCT Filed: Mar. 23, 2018

(86) PCT No.: PCT/US2018/024162
§ 371 (c)(1),
(2) Date: Sep. 23, 2019

(87) PCT Pub. No.: WO2019/005242
PCT Pub. Date: Jan. 3, 2019

(65) Prior Publication Data
US 2020/0378372 A1    Dec. 3, 2020

Related U.S. Application Data

(60) Provisional application No. 62/475,599, filed on Mar. 23, 2017.

(51) Int. Cl.
*F03H 1/00* (2006.01)
*B64G 1/10* (2006.01)
(Continued)

(52) U.S. Cl.
CPC ............. *F03H 1/0087* (2013.01); *B64G 1/10* (2013.01); *B64G 1/405* (2013.01); *B64G 1/428* (2013.01)

(58) Field of Classification Search
None
See application file for complete search history.

(56) References Cited

U.S. PATENT DOCUMENTS

| 5,207,760 A | 5/1993 | Dailey et al. |
| 6,818,853 B1 * | 11/2004 | Schein .................. F03H 1/0012 219/121.52 |

(Continued)

FOREIGN PATENT DOCUMENTS

WO    2012151639 A1    11/2012

OTHER PUBLICATIONS

Kief "Printing Multi-Functionality: Additive Manufacturing for CubeSats" (Year: 2014).*

(Continued)

*Primary Examiner* — Arun Goyal
*Assistant Examiner* — William L Breazeal
(74) *Attorney, Agent, or Firm* — Crawford Maunu PLLC

(57) ABSTRACT

According to certain aspects, an electric-propulsion thruster is used as part of a base or platform which also includes a power converter, having a plurality of inductors and other electrical components, and a printed circuit board (PCB). The PCB includes a layer at which the other electrical components and printed circuit inductor traces, for the plurality of inductors, are secured. The electric-propulsion thruster includes a housing (e.g., as part of the base or platform) providing a cavity and having at least one structurally-rigid side wall along the cavity, where the PCB is integrated with the electric-propulsion thruster for a compact arrangement which can be used to propel the apparatus.

(Continued)

Such a compact design might be used as an important part of thruster spacecraft architecture such as micro-satellites (e.g., CubeSats).

22 Claims, 11 Drawing Sheets

(51) Int. Cl.
    *B64G 1/40*           (2006.01)
    *B64G 1/42*           (2006.01)

(56) References Cited

U.S. PATENT DOCUMENTS

| | | |
|---|---|---|
| 2005/0217238 A1 | 10/2005 | Land, III et al. |
| 2009/0015215 A1* | 1/2009 | Ajram ............... H04B 15/04 323/234 |
| 2014/0202131 A1 | 7/2014 | Boswell |
| 2015/0020502 A1 | 1/2015 | Larigaldie |
| 2015/0210408 A1* | 7/2015 | Dunn .................. B33Y 80/00 244/159.4 |
| 2016/0047364 A1* | 2/2016 | Haque ................ F03H 1/0018 60/203.1 |
| 2016/0273524 A1 | 9/2016 | Keidar et al. |
| 2017/0011835 A1* | 1/2017 | Savage ................ H03H 7/38 |
| 2018/0010586 A1* | 1/2018 | Lichtin ............... B64G 1/428 |
| 2019/0389602 A1* | 12/2019 | Schilling ............ B64G 1/242 |

OTHER PUBLICATIONS

Grieg "Pocket Rocket: An electrothermal plasma micro-thruster" (Year: 2015).*
Wikipedia "CubeSat" (Year: 2016).*
Kim "Microfabrication of air core power inductors with metal-encapsulated polymer vias" (Year: 2013) (Year: 2013).*
USPTO International Search Report & Opinion for related PCT Application No. PCT/US2018/024162 dated Dec. 6, 2018, 11 pages.
G. D. Ewing, "High-efficiency radio-frequency power amplifiers," Ph.D. dissertation, Oregon State University, 1964.
S. Tang, S. Hui, and H.-H. Chung, "Coreless printed circuit board (PCB) transformers with multiple secondary windings for complementary gate drive circuits," IEEE Transactions on Power Electronics, vol. 14, No. 3, pp. 431-437, 1999. (abstract only).
S. Tang, S. Hui, and H.-H. Chung, "Coreless planar printed-circuit-board (PCB) transformers-a fundamental concept for signal and energy transfer," IEEE Transactions on Power Electronics, vol. 15, No. 5, pp. 931-941, 2000.
J. M. Rivas, "Radio frequency dc-dc power conversion," Ph.D. dissertation, Massachusetts Institute of Technology, 2006.
C. R. Sullivan, W. Li, S. Prabhakaran, and S. Lu, "Design and fabrication of low-loss toroidal air-core inductors," in Proc. IEEE Power Electronics Specialists Conf. PESC 2007, 2007, pp. 1754-1759.
J. Vanek, I. Szendiuch, and J. Hladik, "Optimization of properties of planar spiral inductors," in Electronics Technology, 30th International Spring Seminar on, May 2007, pp. 235-238. (abstract only).
M. Zolog, D. Pitica, and O. Pop, "Characterization of spiral planar inductors built on printed circuit boards," in Electronics Technology, 30th International Spring Seminar on, May 2007, pp. 308-313. (abstract only).
J. M. Rivas, Y. Han, O. Leitermann, A. D. Sagneri, and D. J. Perreault, "A high-frequency resonant inverter topology with low-voltage stress," IEEE Transactions on Power Electronics, vol. 23, No. 4, pp. 1759-1771, Jul. 2008.
J. Glaser, J. Nasadoski, and R. Heinrich, "A 900w, 300v to 50v dc-dc power converter with a 30mhz switching frequency," in Applied Power Electronics Conference and Exposition, 2009. APEC 2009. Twenty-Fourth Annual IEEE, Feb. 2009, pp. 1121-1128. (abstract only).
R. Pilawa-Podgurski, A. D. Sagneri, J. M. Rivas, D. I. Anderson, and D. J. Perreault, "Very-High-Frequency resonant boost converters," vol. 24, No. 6, pp. 1654-1665, 2009.
R. Kamali-Sarvestani and J. Williams, "Fabrication of high quality factor rf-resonator using embedded inductor and via capacitor," in IECON 2010—36th Annual Conference on IEEE Industrial Electronics Society, Nov. 2010, pp. 2283-2287.
S. Odandi, B. Allongue, G. Blanchot, S. Buso, F. Faccio, C. Fuentes, M. Kayal, S. Michelis, and G. Spiazzi, "Optimization of shielded PCB air-core toroids for high efficiency dc-dc converters," IEEE Transactions on Power Electronics, vol. 26, pp. 1837-1846, 2011.
D. Oltrogge and K. Leveque, "An evaluation of cubesat orbital decay," 2011.
T. Andersen, C. Zingerli, F. Krismer, J. Kolar, and C. O'Mathuna, "Inductor optimization procedure for power supply in package and power supply on chip," in Energy Conversion Congress and Exposition (ECCE), 2011 IEEE, Sep. 2011, pp. 1320-1327.
R. Boswell, C. Charles, P. Alexander, J. Dedrick, and K. Takahashi, "Plasma expansion from a radio frequency microdischarge," IEEE Transactions on Plasma Science, vol. 39, No. 11, pp. 2512-2513, Nov. 2011. (abstract only).
C. Charles and R. W. Boswell, "Measurement and modelling of a radiofrequency micro-thruster," Plasma Sources Sci Technol. 21, p. 022002 (2012) (abstract only).
NASA, "Cubesats released from space station," NASA, 2013. http://www.nasa.gov/content/cubesats-released-fromspace-station-0.
L. Qiao, C. Rizos, and A. G. Dempster, "Analysis and comparison of cubesat lifetime," 2013.
NASA, "Benefits stemming from space exploration," NASA, 2013. [Online]. Available: https://www.nasa.gov/sites/default/files/files/Benefits-Stemming-from-Space-Exploration-2013-TAGGED.pdf.
Z. Tang, R. Chandrasekara, Y. Y. Sean, C. Cheng, C. Wildfeuer, and A. Ling, "Near-space flight of a correlated photon system," Scientific Reports, vol. 4, No. 6366, 2014.
H. Bahcivan, J. W. Cutler, J. C. Springmann, R. Doe, and M. J. Nicolls, "Magnetic aspect sensitivity of high-latitude e region irregularities measured by the rax-2 cubesat," Journal of Geophysical Resear [Online]. Available: http://dx.doi.org/10.1002/2013JA019547.
S. Raju, R. Wu, M. Chan, and C. Yue, "Modeling of mutual coupling between planar inductors in wireless power applications," IEEE Transactions on Power Electronics, vol. 29, No. 1, pp. 481-490, 2014.
W. Liang, J. Glaser, and J. Rivas, "13.56 mhz high density dc-dc converter with pcb inductors," Power Electronics, IEEE Transactions on, vol. 30, No. 8, pp. 4291-4301, Aug. 2015.
W. Liang, L. Raymond, L. Gu, and J. Rivas, "27.12mhz gan resonant power converter with pcb embedded resonant air core inductors and capacitors," in 2015 IEEE Energy Conversion Congress and Exposition (ECCE), Sep. 2015, pp. 4251-4256. (abstract only).
A. D. Greig, "Pocket rocket: An electrothermal plasma micro-thruster," Ph.D. dissertation, The Australian National University, 2015.
A. Greig, C. Charles, and R. W. Boswell, "Simulation of main plasma parameters of a cylindrical asymmetric capacitively coupled plasma micro-thruster using computational fluid dynamics," Frontiers in Physics, vol. 2, No. 80, 2015.
C. Charles, A. Bish, R. W. Boswell, J. Dedrick, A. Greig, R. Hawkins, and T. S. Ho, "A short review of experimental and computational diagnostics for radiofrequency plasma micro-thrusters," Plasma Chemistry and Plasma Processing, vol. 36, No. 1, pp. 29-44, 2016. [Online]. Available: http://dx.doi.org/10.1007/s11090-015-9654-5 (abstract only).
C. Charles, R. W. Boswell, A. Bish, V. Khayms, and E. F. Scholz, "Direct measurement of axial momentum imparted by an electrothermal radiofrequency plasma micro-thruster," Frontiers in Physics, vol. 4, No. 19, 2016.
Z. Tang, R. Chandrasekara, Y. C. Tan, C. Cheng, K. Durak, and A. Ling, "The photon pair source that survived a rocket explosion," Scientific Reports, vol. 6, No. 25603, 2016.

(56) References Cited

OTHER PUBLICATIONS

W. Liang, L. Raymond, and J. Rivas, "3-d-printed air-core inductors for high-frequency power converters," IEEE Transactions on Power Electronics, vol. 31, No. 1, pp. 52-64, Jan. 2016. (abstract only).

Y. Nour, Z. Ouyang, A. Knott, and I. H. H. Jrgensen, "Design and implementation of high frequency buck converter using multi-layer pcb inductor," in IECON 2016—42nd Annual Conference of the IEEE Industrial Electronics Society, Oct. 2016, pp. 1313-1317.

A. Privat-Maldonado, D. OConnell, E. Welch, R. Vann, and M. W. van der Woude, "Spatial dependence of dna damage in bacteria due to low-temperature plasma application as assessed at the single cell level," Scientific Reports, vol. 6, No. 35646, 2016.

A. Stuchbery, "Development, integration and testing of the pocket rocket plasma thruster," Honours Thesis, The Australian National University, 2017.

W. Liang, L. Raymond, J. R. Davila, C. Charles, and R. Boswell, "Structurally supportive rf power inverter for a cubesat electrothermal plasma micro-thruster with pcb inductors," in 2017 IEEE Applied Power Electronics Conference and Exposition (APEC), Mar. 2017, pp. 2141-2145, (abstract only).

S. Battersby, "Inner workings: Cubesats set to tackle living systems, effects of deep space radiation," Proceedings of the National Academy of Sciences, vol. 114, No. 41, pp. 10 805-10 807, 2017.

S. Chien and K. L. Wagstaff, "Robotic space exploration agents," Science Robotics, vol. 2, No. 7, 2017. [Online]. Available: http://robotics.sciencemag.org/content/2/7/eaan4831 (abstract only).

J. Sokol, "Minisatellite surge spurs downlink infrastructure," Science, vol. 357, No. 6358, pp. 1.

J. Y. Kim, E. S. Seo, H. Kim, J.-W. Park, D.-K. Lim, and D. W. Moon, "Atmospheric pressure mass spectrometric imaging of live hippocampal tissue slices with subcellular spatial resolution," Nature Communications, vol. 8, No. 1, 2017.

X. Li, R. Selesnick, Q. Schiller, K. Zhang, H. Zhao, D. N. Baker, and M. A. Temerin, "Measurement of electrons from albedo neutron decay and neutron density in near-earth space," Nature, vol. 552, No. 382, 2017.

E. Asphaug, J. Thangavelautham, A. Klesh, A. Chandra, R. Nallapu, L. Raura, M. Herreras-Martinez, and S. Schwartz, "A cubesat centrifuge for long duration milligravity research," npj Microgravity, vol. 3, No. 1, 2017.

E. Hand, "Cubesat networks hasten shift to commercial weather data," Science, vol. 357, No. 6347, pp. 118-119, 2017.

M. Fink, A. Rodriguez-Aramendia, J. Handsteiner, A. Ziarkash, F. Steinlechner, T. Scheidl, I. Fuentes, J. Pienaar, T. C. Ralph, and R. Ursin, Experimental test of photonic entanglement in accelerated reference fra [Online]. Available: http//dx.doi.org/10.1038/ncomms15304.

T. S. Ho, C. Charles, and R. Boswell, "Neutral gas heating and ion transport in a constricted plasma flow," Physics of Plasmas, vol. 24, No. 8, p. 084501, 2017. http://www.frontiersin.org/plasma physics/10.3389/fphy.2014.00080/abstract (abstract only).

* cited by examiner

COMPACT PLASMA THRUSTER

FEDERALLY-SPONSORED RESEARCH AND DEVELOPMENT

This invention was made with Government support under contract 1439935 awarded by the National Science Foundation. The U.S. Government has certain rights in the invention.

OVERVIEW

Aspects of various embodiments are directed to relatively compact electric-propulsion thrusters including but not necessarily limited to micro-thrusters as might be used in space applications, satellites, and the like.

Among a growing number of applications, ion-plasma thrusters are used in various types of satellite-type spacecraft ("satellites") as known for carrying a living payload and those for such uses as space exploration, research, and communications. Some of the larger types of spacecraft typically have a multiple thrusters of different types for propulsion and orientation of the craft. For present day satellites, which are of a relatively large construction, the thrusters are larger and more expensive than needed for micro-spacecraft such as micro-satellites. Whether for such larger types of spacecraft or for micro-spacecraft, typically the size of a thruster is directly related to the amount of power which the thruster can provide and with the goal of decreased size and increased power. In this regard, there is an ongoing need to reduce the size of each thruster and to increase its output power relative to the size of the thruster.

An example of one type of spacecraft benefiting from ion-plasma thruster technology, is a sub-class of micro-satellites referred to as a CubeSat. A CubeSat includes a housing or base platform for containing and configuring somewhat standardized components. The housing platform takes the form of one or multiple cubes on the order of several centimeters (10 cm) in each of three dimensions, or one or multiple 10 cm cubes. The recent popularity of the CubeSat platform is in part due to the low operation and launch costs that are putting "access to space" within the reach of academic institutions, small companies, and even individuals. There has also been interest in developing commercial applications using CubeSats including imaging and monitoring of resources, communication, asteroid mining, etc. CubeSats are sometimes released into orbit from the international space station (ISS) and can be deployed from rockets as secondary payloads as the rocket ascends to fulfill its primary mission. The Cubesats deployed from the ISS have a lifetime of just a few months as they travel (e.g., orbital maneuvering and/or station keeping) in a decaying Low Earth Orbit (LEO) affected by atmospheric drag. Other CubeSats deployed from higher altitude rockets can last in space for years, but are often placed in non-circular or highly elliptic orbits that are sub-optimal for imaging tasks.

SUMMARY

The above and other matters have presented challenges which are overcome by certain aspects and embodiments presented in this instant disclosure. For example, in certain specific embodiments, such aspects include, among others, a panel-like apparatus which is advantageous for providing a relatively powerful, yet compact, electric-propulsion thruster (e.g., an electro-thermal plasma micro-thruster) which might be used to offset the size and weight in a variety of applications including, for example, satellites which are launched and/or propelled for long periods in space.

In connection with efforts leading to the instant disclosure, discoveries herewith concern circuit and thruster plenum designs for implementing spacecraft and other vehicles and structures propelled by an electric-type (e.g., plasma-ion) thruster architecture occupying minimal, or in some instances, virtually negligible space within the platform base which contains both the power converter with its inductors and other electrical components, and the power converter which supplies operating power to the thruster.

In a more specific embodiment, such an architecture implements such a power converter and the associated power converter integrated to and with a printed circuit board (PCB) which, in turn, is secured along or as part of a sidewall of the platform base. The rigidity of the PCB and its location along the platform sidewall can be used to provide support for the spacecraft and thereby occupy minimal space within the platform base (e.g., 111 of FIG. 1B).

In yet a more specific embodiment, a plasma-ion thruster spacecraft architecture facilitates optimal thrust power using very little, or minimized, space in a spacecraft platform such as platforms used in micro-satellites (e.g., CubeSats). In one particular example, the architecture includes an electro-thermal plasma-ion thruster for electric spacecraft propulsion, a power converter with inductors and other electrical components providing operating power to the electro-thermal plasma-ion thruster; and a printed circuit board including layer(s) securing printed circuit board (PCB) as well as the inductors and other components of the power converter. As secured/integrated on or within the PCB, a platform base uses rigidity of the PCB along a sidewall of the platform to provide support for the spacecraft. In a more specific example, such an architecture permits the platform base to accommodate a CubSat design for which space is on the order of 10 cm Cube.

The above discussion/summary is not intended to describe each embodiment or every implementation of the instant disclosure. The figures and detailed description that follow also exemplify various embodiments.

BRIEF DESCRIPTION OF FIGURES

Various example embodiments may be more completely understood in consideration of the following detailed description in connection with the accompanying drawings, in which.

Figure 1A:
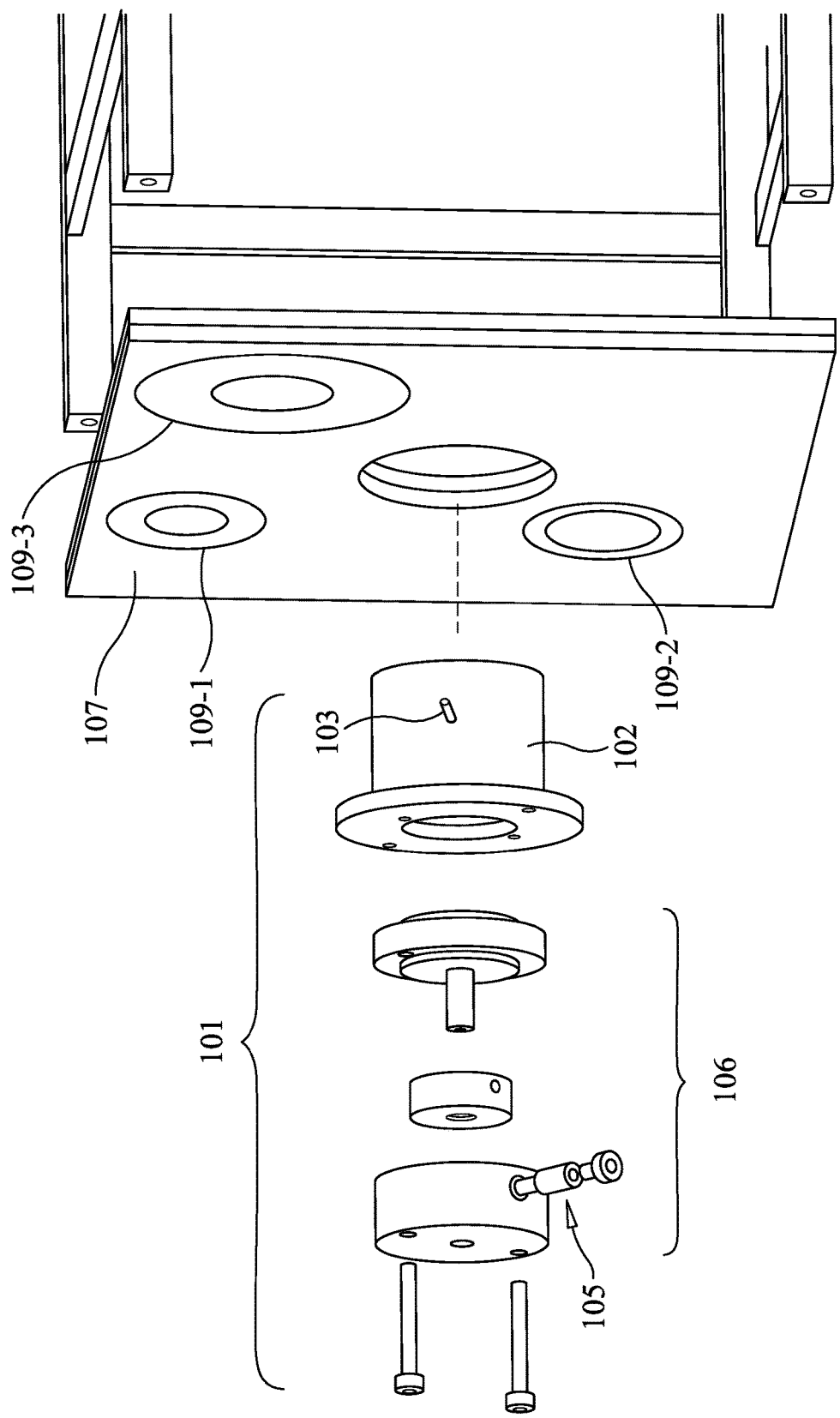
FIG. 1A illustrates a side view of the electric-propulsion thruster, including an integrated power converter and micro thruster comprising a side wall of the electric-propulsion thruster, in accordance with the instant disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

DETAILED DESCRIPTION

Aspects of the instant disclosure are believed to be applicable to a variety of different types of apparatuses, systems and methods involving or using (e.g., electric-propulsion) thrusters for powering spacecraft. In certain implementations, aspects of the instant disclosure have been shown to be beneficial when used in the context of micro-spacecraft or micro-satellites, where minimization of size can be very important. In this context, aspects of the thruster designs discussed herein are applicable to a variety of mobile structures. For example, one such application is discussed in terms of a CubeSat where a CubeSat housing or platform, or the order of 10 cm cubes, is used for containing and configuring the power supply and the thruster components. While not necessarily so limited, various aspects may be appreciated through the following discussion of non-limiting examples which use exemplary contexts.

Accordingly, in the following description various specific details are set forth to describe specific examples presented herein. It should be apparent to one skilled in the art, however, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element. Also, although aspects and features may in some cases be described in individual figures, it will be appreciated that features from one figure or embodiment can be combined with features of another figure or embodiment even though the combination is not explicitly shown or explicitly described as a combination.

In accordance with specific embodiments discussed or illustrated by way of the instant disclosure, it is appreciated that there are many different types of implementations which can be employed. While such details might be important for specific applications, an appreciation of the instant disclosure might be best appreciated by way of a higher-level discussion of some of the main circuit blocks, such as a particular of a power supply circuit which drives a particularly-exemplified thruster. Consistent with such embodiments, one example is provided in the form of a thruster architecture which includes an electro-thermal plasma-ion thruster for electric spacecraft propulsion, a power converter with inductors and other electrical components providing operating power to the electro-thermal plasma-ion thruster, and a printed circuit board including layer(s) securing printed circuit board (PCB) as well as the inductors and other components of the power converter. A power converter may include a power inverter, such as a class $\Phi_2$ inverter, as discussed further herein. As secured/integrated on or within the PCB, a platform base uses rigidity of the PCB along a sidewall of the platform to provide support for the apparatus to free up space within the thruster platform and, as may be appropriate for a given application, to displace other structure which might otherwise be needed for structural support for the thruster platform at or along the sidewall.

Examples of the present disclosure describe a compact and efficient switched mode direct current-radio frequency (dc-RF) power inverter integrated with an electro-thermal plasma micro-thruster for CubeSat propulsion. The integrated system can serve as side panels and structural support of CubeSats, saving precious on-board volume for propellant (e.g., plasma, liquid or gas) and/or payloads. Moreover, the proposed power delivery design and implementation can also be used in other type of electric propulsion systems for various types of spacecraft, as well as other emerging applications that value size and weight reduction and portability of power electronics systems. For example, the integrated system can be directly applied to microelectronics RF plasma systems or to the use of atmospheric plasma jets for biomedical or imaging applications of atmospheric plasma jets.

In more specific embodiments, an apparatus is provided including a plurality of inductors and other electrical components, configured and arranged to provide operating power to load terminals. The apparatus further includes a PCB including at least one layer at which the other electrical components and printed circuit inductor traces, for the plurality of inductors, are secured. Additionally, the apparatus includes an electric-propulsion thruster, including a housing providing a cavity and having at least one structurally-rigid side wall along the cavity and integrating the PCB, the electric-propulsion thruster being configured and arranged to propel the apparatus in response to a change in electrical-energy at the load terminals. In some examples, the electric-propulsion thruster is at least one of: an electro-thermal thruster; an electro-static thruster; and an electro-magnetic thruster. Additionally and/or alternatively, the electric-propulsion thruster may be an electro-thermal plasma-ion thruster, and the PCB may be integral with or part of at least one side wall of the apparatus.

In various embodiments, the apparatus is a cubically-shaped satellite (e.g., a CubeSat) and wherein said at least one structurally-rigid side wall includes multiple side sections and the PCB being configured and arranged along one of the multiple side sections, and further including another electric-propulsion thruster and another PCB, each being common to the housing and part of another of multiple side sections. In some examples, the power converter is configured and arranged with the plurality of inductors and other electrical components to cause, during operation, an output signal pulsing between 10 megahertz (MHz) and 30 MHz.

As an additional example, an apparatus is provided comprising at least one power converter, including at least one set of inductors and other electrical components, configured and arranged to provide operating power to at least one set of load terminals. The apparatus includes a first PCB and a second PCB, each including at least one layer at which said at least one set of inductors and other electrical components are secured. The apparatus further includes an electric-propulsion thruster, including a housing providing a cavity and having first and second structurally-rigid sidewall sections along the cavity and respectively integrating the first and second PCBs, the electric-propulsion thruster being configured and arranged to propel the apparatus in response to a change in electrical-energy at the at least one set of load terminals.

In some examples, the electric-propulsion thruster is an electro-thermal plasma-ion thruster, and the PCB is integral with or part of said at least one side wall. In such examples, the housing is part of a platform, the platform being configured and arranged for a microsatellite including each PCB with a maximum dimension of less than 15 cm for its height dimension and for its length dimension. Examples are not so limited, however. In some examples, the PCB has dimensions ranging from: 0.2 milimeters (mm) to 20 mm in thickness, 5 cm to 15 cm in height, and 5 cm to 30 cm in length.

In some examples, the power converter is configured and arranged with the plurality of inductors and other electrical components causing, during operation, an output signal pulsing beyond 10 MHz. As discussed further herein, the plurality of inductors are arranged along a planar surface as printed traces on or as part of a layer of the PCB.

In additional specific embodiments, a method is provided comprising providing a power converter and a PCB as an integrated unit in which the power converter is secured with the PCB, the power converter including circuitry having inductors and other electrical components electrically connected to output terminals, and securing at least one electric-propulsion thruster component to the printed circuit board. The method further includes securing said at least one electric-propulsion thruster component and the printed circuit, as integrated with the power converter, to a platform and arranged along a structurally-rigid side wall of the platform. The method further includes using the power converter to generate electrical energy at the output terminals, and in response creating propulsion energy sufficient to move the platform.

Figure 1B:
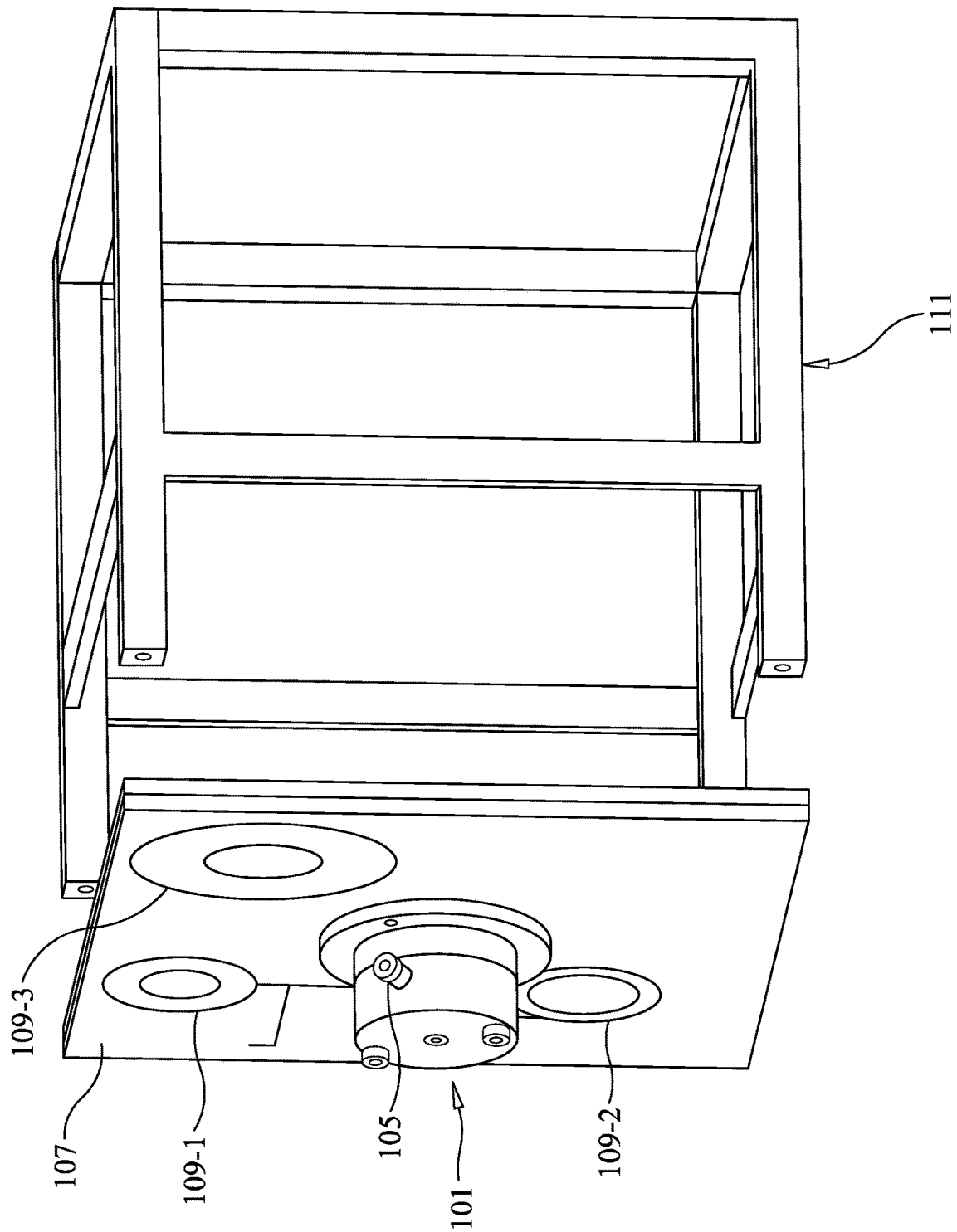
FIG. 1B illustrates a side view of the electric-propulsion thruster, including an integrated power converter and electric-propulsion thruster comprising a side wall of the electric-propulsion thruster as implemented in a CubeSat, in accordance with the instant disclosure.

FIG. 1A illustrates a side view of the electric-propulsion thruster, including an integrated power converter and micro thruster comprising a side wall of the compact plasma thruster, in accordance with the instant disclosure. FIG. 1B illustrates a side view of the electric-propulsion thruster, including an integrated power converter and micro thruster comprising a side wall of the electric-propulsion thruster as implemented in a CubeSat, in accordance with the instant disclosure. Specifically, FIGS. 1A and 1B show an integrated power converter and micro thruster comprising a side wall of the CubeSat. As illustrated in FIG. 1A, the micro thruster 101 includes a gas inlet cavity 102 for receiving gas propellant via input 103, as well as an insulating part 106. The gas inlet cavity 102 also serves as a ground electrode. The insulating part 106 may include discrete components to feed the input gas through the body of the micro thruster 101. Additionally, the micro thruster 101 includes an RF electrode 105, disposed within the insulating part 106. RF power is supplied at the electrode 105, creating an asymmetric weakly ionized (less than 1%) capacitively coupled plasma (CCP) inside the micro thruster 101. Plasma heating of the propellant increases its exhaust velocity and therefore provide extra thrust than just passing through cold gas. The micro thruster 101 may be disposed on a PCB 107, as illustrated, which comprises a side-wall of the apparatus.

FIG. 1B illustrates an integrated power converter and micro thruster comprising a side wall of a cubically-shaped satellite (e.g., a CubeSat). As noted above, other mobile structures benefitting from aspects of the instant disclosure find benefit, for example, in microsatellites including but not limited to CubeSats. Another example also benefitting from such aspects are the types of mobile structures having related circuitry and architecture as illustrated and described in patent document #US 2014/0202131 filed on May 12, 2012, incorporated by reference generally, and for the above aspects.

In an example embodiment, referring to the CubeSat of FIG. 1B, the electric-propulsion thruster 101 is fed with 40 sccm of argon (Ar) gas flow and produces a plasma plume at its exhaust (e.g., the extending away from the PCB 107). In such examples, the integrated thruster and power converter weighs about 150 grams (g) and has a footprint of about 10 cm by 10 cm by 7 mm while the electric-propulsion thruster 101 protrudes about 15 mm outside of the surface of the PCB 107. There is no parasitic discharge shown on the board at a chamber pressure of about 0.3 microtorr (µtorr). The power converter draws about 45 watts (W) peak power at 14 volts direct current (V dc) input and can be bursted at much lower rate to achieve below 1 W average power consumption to accommodate low power budget on board CubeSats.

In some examples, peripheral systems such as battery unit and wireless gate drive control unit can be incorporated. With the system occupying well under 1 U, the advantages over other commercial available or in-development micro thruster systems are significant. It provides flexibility of reconfiguration for overall CubeSat design and mission planning, such as adding more gas propellant for longer thruster operation, or reducing overall CubeSat volume when combining payload into the thruster 1 U allocation. In some embodiments, multiple integrated thrusters and power converter systems may be used on different CubeSat sides for more complex maneuvering at different axis.

Figure 2A:
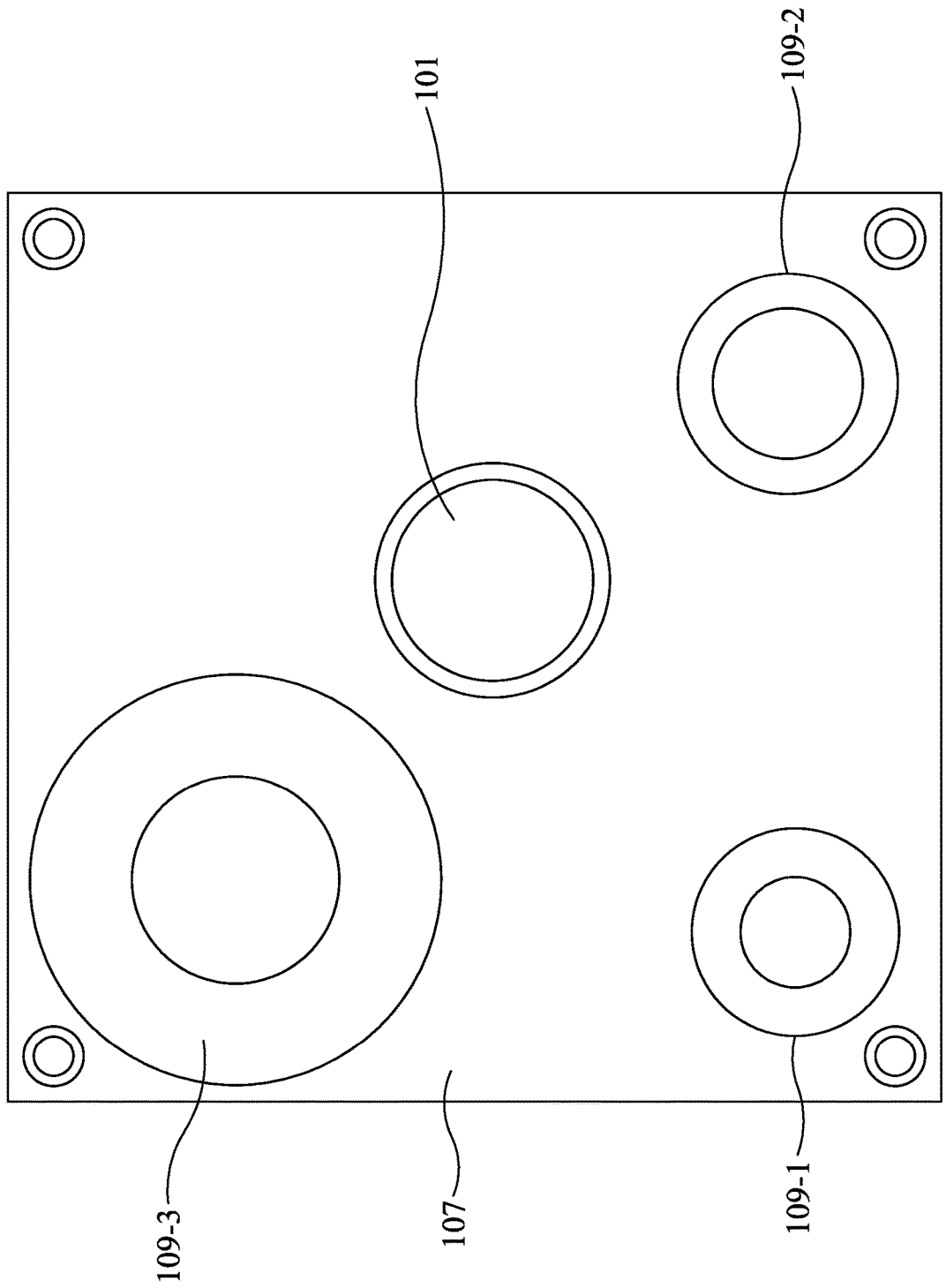
FIG. 2A illustrates an unpopulated PCB for the circuit of the electric-propulsion thruster, in accordance with the instant disclosure.

FIG. 2A shows an unpopulated PCB 107 for the circuit. As illustrated, the inductors 109-1, 109-2, and 109-3 in the circuit are already fabricated onto the PCB 107 leaving empty pads for placing capacitors and MOSFET. The PCB material may be FR4. Examples are not so limited, however, and additional materials such as ceramic based or metal core substrate may be used to improve the PCB thermal and mechanical properties. Also, as illustrated in FIG. 2A, the electric-propulsion thruster 101 is secured to or otherwise disposed on the PCB 107, in a manner that is offset from a center axis of the PCB 107.

Figure 2B:
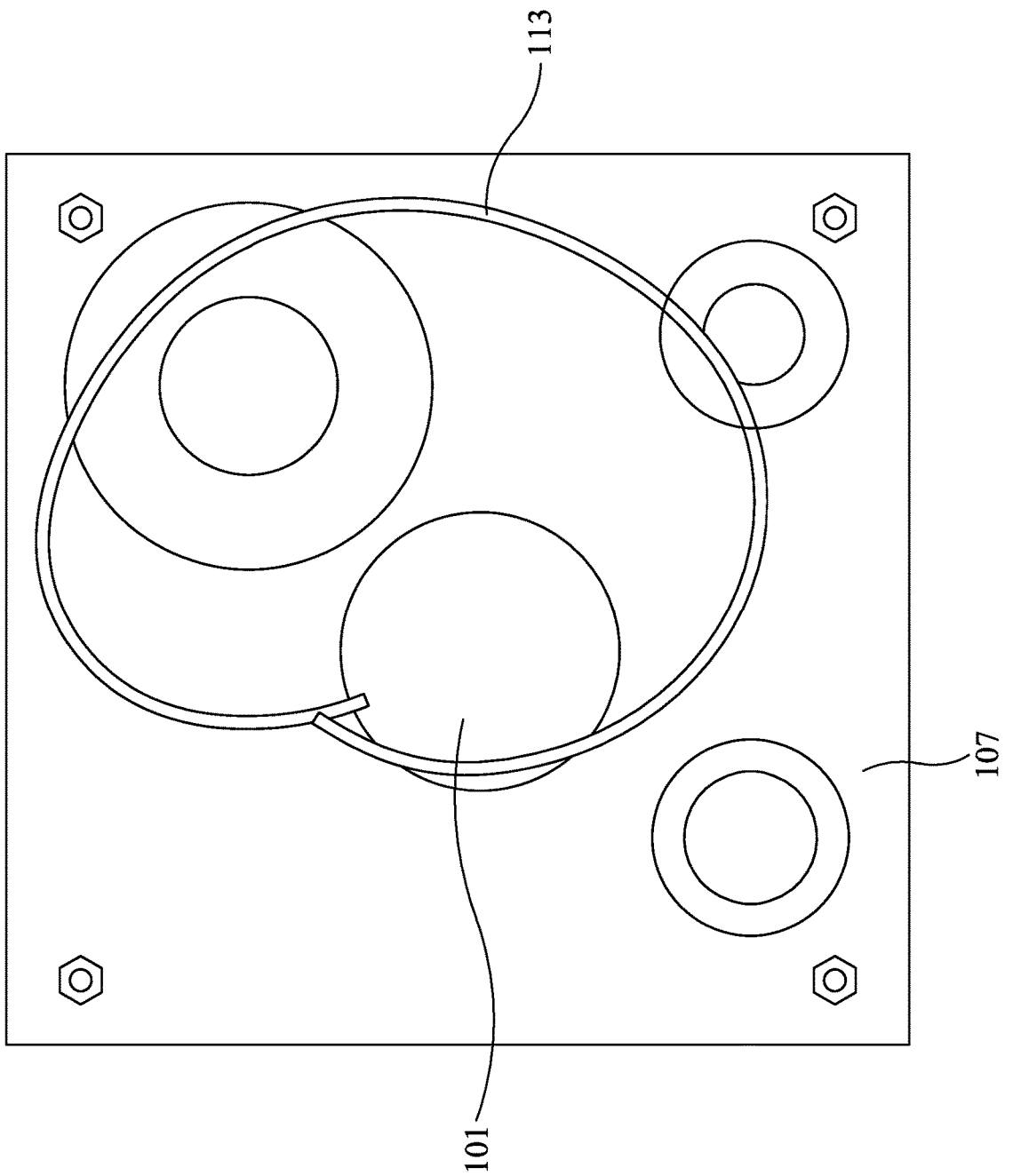
FIG. 2B shows a back side of the integrated power converter and electric-propulsion thruster, including a gas subsystem, in accordance with the instant disclosure.

FIG. 2B shows a back side of the integrated power converter and micro thruster, including gas subsystem. The gas subsystem may be disposed within the cavity of the CubeSat. As illustrated in FIG. 2B, a plastic tube 113 can be connected to the gas subsystem and provide a gas feed to the electric-propulsion micro thruster 101.

Figure 2C:
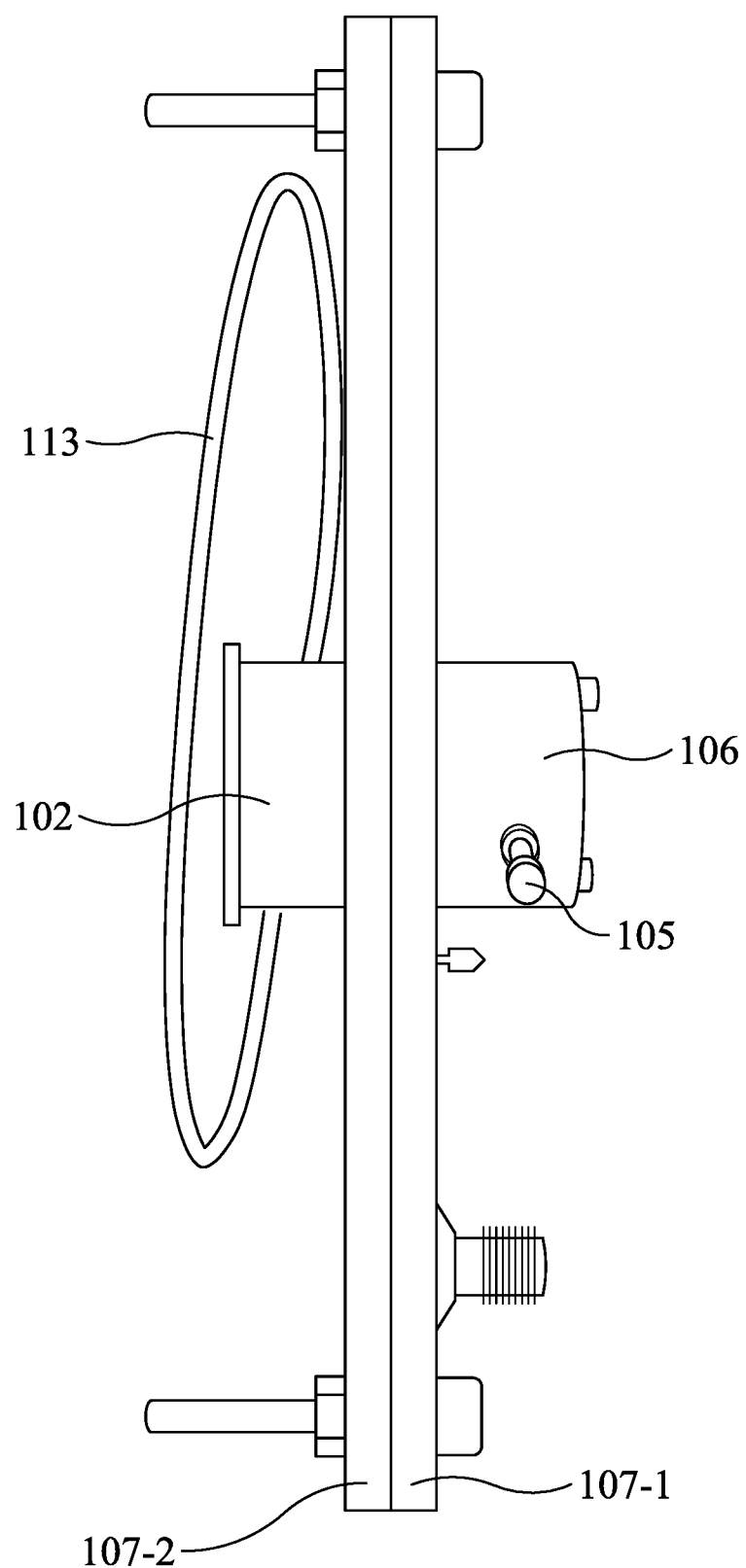
FIG. 2C illustrates a side-view of the integrated power converter and electric-propulsion thruster, in accordance with the instant disclosure.

FIG. 2C shows a side-view of the integrated power converter and micro thruster. A plenum (gas inlet cavity) 102 of the micro thruster extends along an inside portion of the cavity of the CubeSat, whereas an insulating part 106 extends along an outside portion of the CubeSat. As discussed further herein, the illustrated sidewall of the CubeSat comprises two PCBs, 107-1 and 107-2, layered on top of one another.

Figure 3:
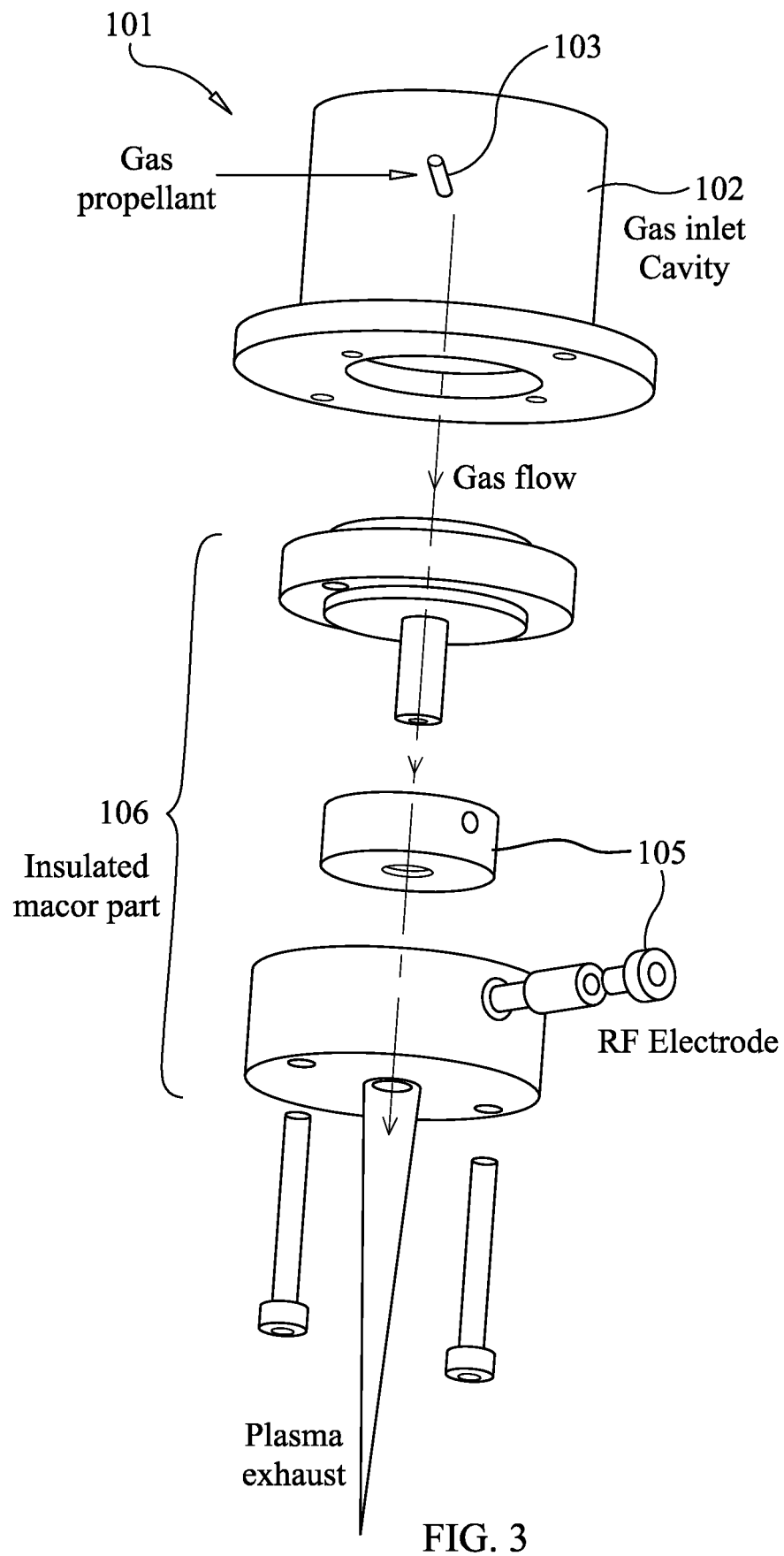
FIG. 3 shows an assembly view of an electric-propulsion thruster, in accordance with the instant disclosure.

FIG. 3 shows an assembly view of the electric-propulsion thruster. The insulating part 106 includes a central metallic copper electrode which is fed by the PCB output signal via the RF electrode feed. Together, the central metallic copper electrode and the RF electrode feed are illustrated in FIG. 3 as RF electrode 105. As illustrated, the electric-propulsion thruster 101 includes an RF electrode 105, a gas inlet cavity 102 (e.g., plenum), and an insulating part 106 which includes a 24 mm outer diameter housing, and a 1.5 mm-diameter and 18 mm-long cylindrical plasma cavity. The relatively small size of the electric-propulsion thruster 101 allows the integrated thruster and the power converter PCB to serve as one side panel of CubeSat, occupying minimal footprint inside the cavity of the CubeSat. By minimizing the footprint of the thruster and power converter inside the cavity of the CubeSat, more propellant and/or payload can be added from the saved volume. The gas propellant (such as Ar, xenon (Xe), nitrogen (N2), and/or carbon dioxide (CO2)) is fed though the gas inlet cavity 102 (pressure of a few torr) and through the body of the electric-propulsion thruster 101, creating a chocked flow into the smaller diameter plasma cavity. The plasma exhaust exits the bottom of the electric-propulsion thruster 101 as illustrated in FIG. 3.

Consideration of example spacecraft thrusters are used to help appreciate benefits of reducing the footprint of the integrated thruster and power converter. For instance, a CubeSat having dimensions of 10 cm height, 10 cm width, and 10 cm length has total cavity volume of 1000 cm$^3$. Including one or more thrusters inside the cavity, each occupying a portion of the 1000 cm$^3$, reduces the total cavity volume available for propellant, payload, and/or other components to be disposed inside the spacecraft. Integration of the thruster and power converter in the sidewalls of the spacecraft preserves space within the cavity for such components. Additionally, by incorporating the thruster and power converter in the sidewalls, the resulting system can be scaled in a linear manner.

In related specific example embodiments, RF power is supplied at the electrode 105, creating an asymmetric weakly ionized (less than 1%) capacitively coupled plasma (CCP) inside the tube. Plasma heating of the propellant will increase its exhaust velocity and therefore provide extra thrust than just passing through cold gas.

Figure 4A:
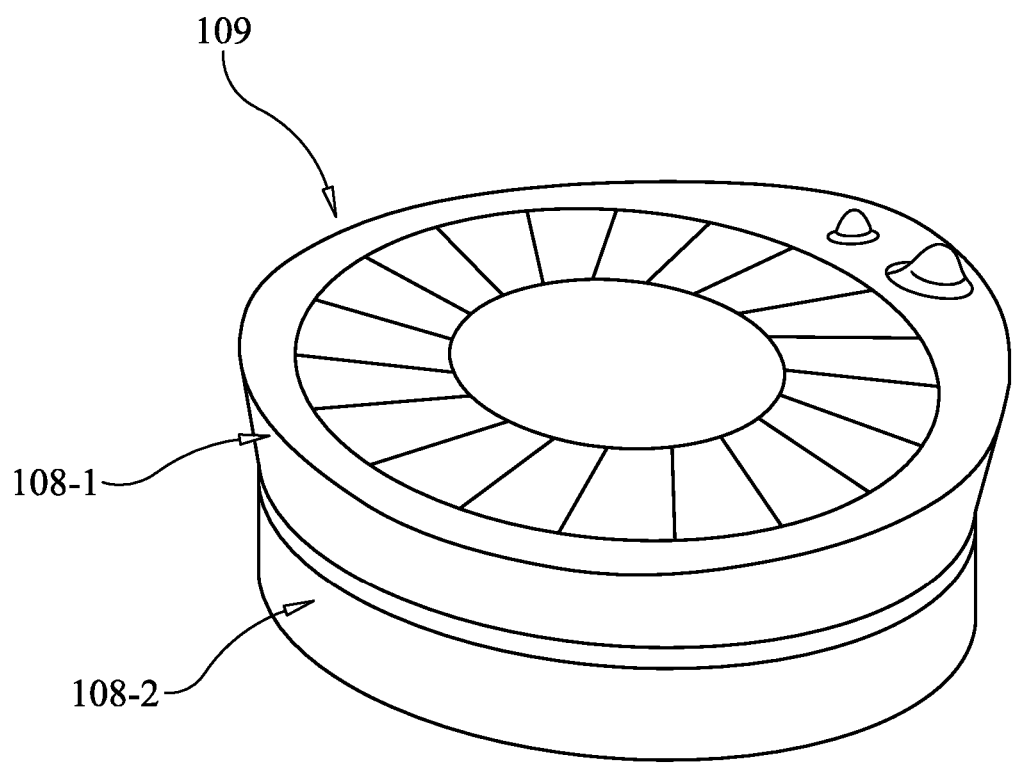
FIGS. 4A-4C illustrate aspects of an example power converter, in accordance with the present disclosure.
Figure 4B:
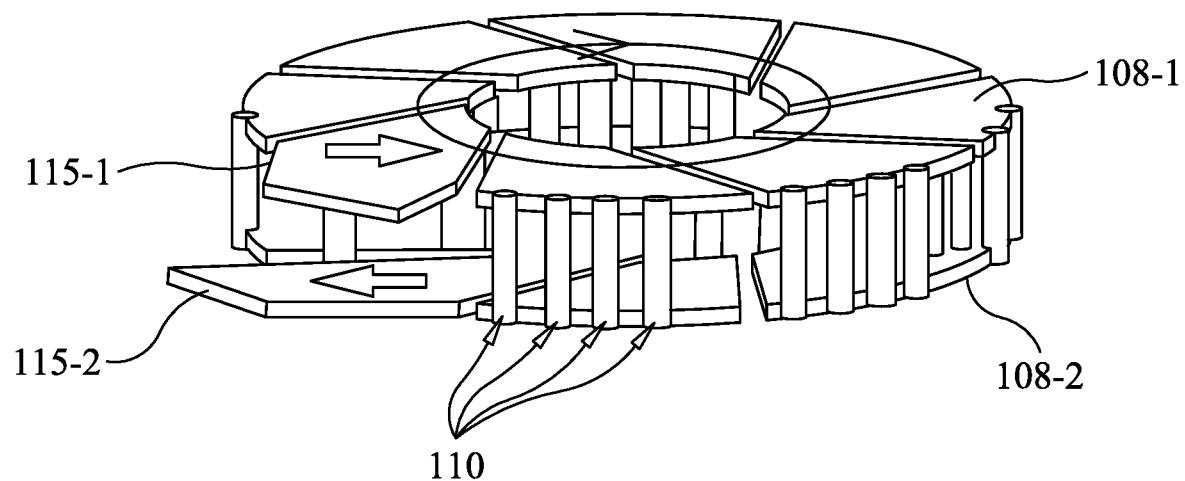
Figure 4C:
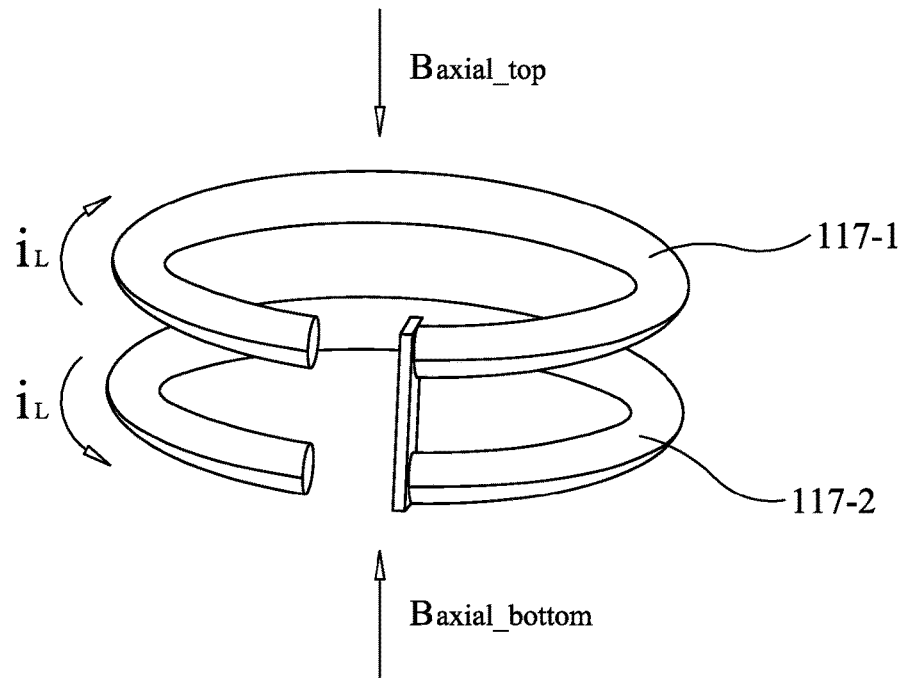

FIGS. 4A, 4B, and 4C illustrate aspects of an example power converter, in accordance with the present disclosure. In accordance with example embodiments, air core toroidal inductors may be used as a power converter. Specifically, air core toroidal inductors may be used instead of magnetic cored inductors. Such air core toroidal inductors may be directly printed on the PCB using copper traces and vias. As switching frequency increases, magnetic components (inductors, transformers, etc.), which often dominate the size and weight of power supplies, can have smaller values and sizes. Particularly, at beyond 10 MHz, any heavy and brittle ferromagnetic inductor cores which induces core losses that increase faster with switching frequency can be eliminated and replaced by air core inductors. At this frequency range, not only inductance values become small enough to be compatible with air core designs, but air core inductors may also bring several advantages to the system. Specifically, performance (e.g., quality factor Q) of air core magnetic components improves as switching frequency increases (Q∝ $\sqrt{f_s}$). Also, air core inductors are not limited by saturation or by a Curie temperature limit. Moreover, modern fabrication techniques (e.g., PCB, 3D printing, etc.) can be leveraged to reduce weight and cost without sacrificing performance.

In example embodiments, the PCB air core inductors presented here are toroidal in shape, as illustrated in FIGS. 4A-4C. Compared to air core spiral and solenoid shape inductors, toroids have the advantage of confining the majority of the magnetic flux within the torus. This leads to reduced electromagnetic interference (EMI) with other components especially in a compact system. To predict inductance values of air core toroidal inductors, the following equation may be used:

$$L = \frac{N^2 h \mu_0}{2\pi} \ln\left(\frac{d_o}{d_i}\right) + \frac{d_i + d_o}{4}\mu_0\left[\ln\left(8\frac{d_o + d_i}{d_o - d_i}\right) - 2\right] \quad (1)$$

where N is turn number, and $d_o$, $d_i$, h denote outer, inner diameter and height of the toroid, respectively.

The first part of the equation represents the inductance from the flux within the torus structure while the second part calculates the "one turn" inductance induced by the circumferential direction current when it travels through the toroid 109 as illustrated in FIG. 4A. Toroidal inductors tend to have good quality factors when they have close to square shape cross sections. Hence PCBs with a thickness of 1.6 mm limit maximum inductance value from the torus structure if maintaining a square cross section. In some examples, PCBs that range in thickness from 3.2 mm to 6.4 mm may be used to achieve a good balance between electrical performance and ease of fabrication processes. Moreover, automated scripts may be designed to generate the copper traces shapes, vias locations, and layout files for PCB inductors, which further simplifies the design process. For different current carrying capabilities and operating frequencies, copper weight/thickness (e.g., 2 ounces (oz) or more) can also be specified in the PCB fabrication process. Printing air core inductors on PCB takes the advantages of low part to part variation, streamlined manufacturing, and low prototyping cost of the PCB process and can benefit significantly for high frequency (beyond 10 MHz) power converters.

To further mitigate the external flux caused by the "one turn" inductance that contributes to EMI, each air core inductor is also split into two double (or half) values connected in parallel (or series) with the same dimensions but opposite circumferential current directions, as illustrated in FIGS. 4A-4C. The two double (or half) valued inductors are then printed on two vertically stacked boards, as shown in FIGS. 4A and 4B, to cancel axial direction flux induced outside the torus. For example, the inductor 109 illustrated in FIG. 4A includes two inductors 108-1 and 108-2, which are vertically stacked boards. By applying this technique, the class $\Phi_2$ converter and the matching network are implemented on two stacked 3.2 mm thickness PCBs (e.g., illustrated as inductor 109 in FIG. 4A).

FIG. 4B illustrates a hollowed out schematic of the PCB toroidal air core inductor 109 illustrated in FIG. 4A. The top 108-1 and bottom 108-2 of the toroid are copper planes on PCB and the vertical connections 110 are made through vias. As the current enters and exits at two terminals (e.g., 115-1 and 115-2) of the toroid, it creates a circumferential current path as indicated in the figure. The circumferential current induces axial flux outside the torus. By vertically stacking two PCB toroidal inductors with the same dimensions and turns but opposite winding directions, the axial flux of the two toroids cancels as illustrated in FIG. 4C and therefore mitigates EMI issue.

Figure 4D:
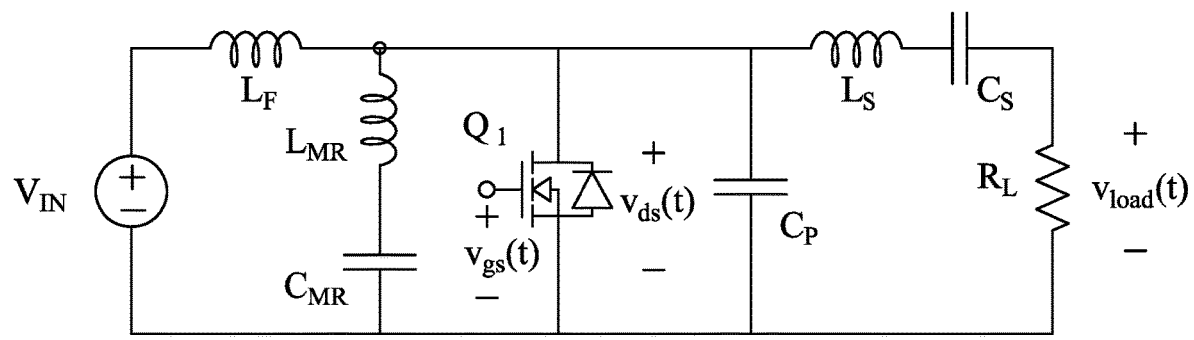
FIGS. 4D-4F illustrate aspects of the topology for the power converter, in accordance with the present disclosure.
Figure 4E:
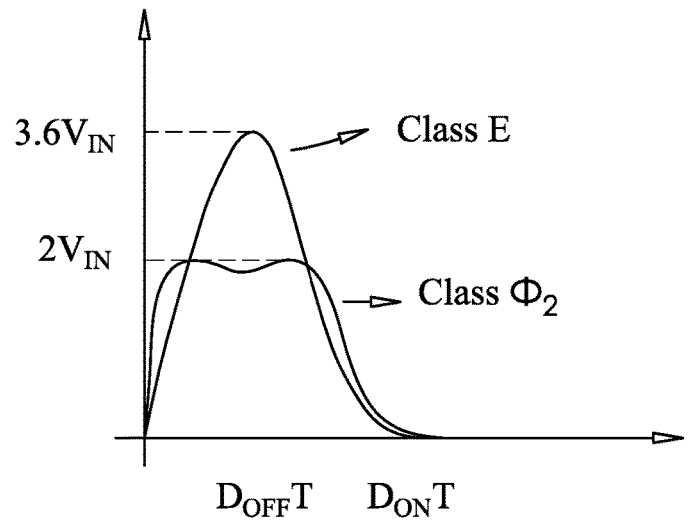
Figure 4F:
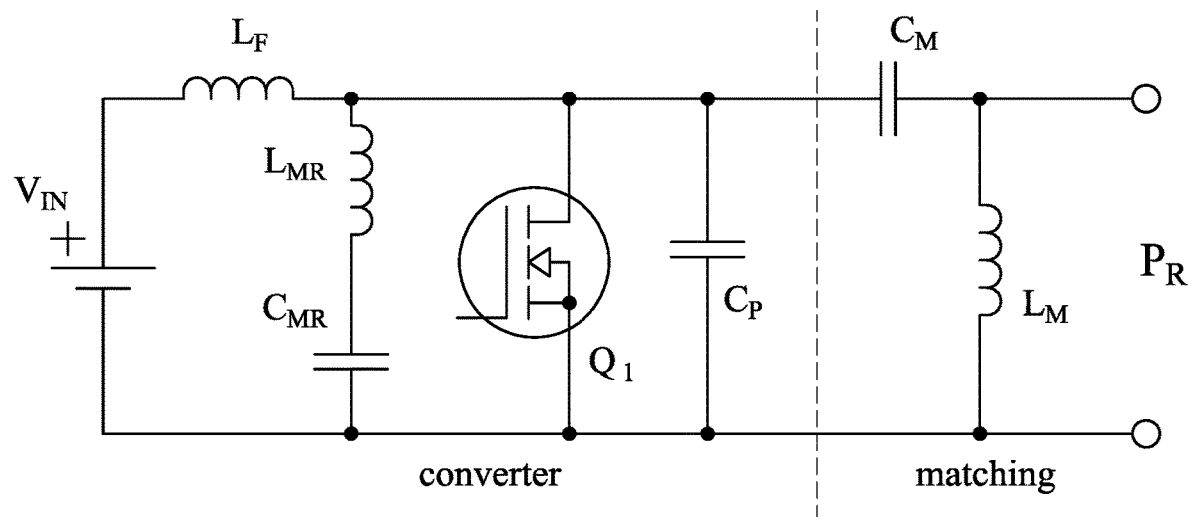

FIGS. 4D-4F illustrate aspects of the topology for the power converter, in accordance with the present disclosure. To develop efficient and compact power electronics for a micro-scale electro-thermal plasma thruster, a two-prong approach is proposed. First is to replace linear mode RF power amplifiers with their switched mode counterparts. Linear mode RF power amplifiers (e.g., Class AB topology) may be used as the power source for plasma generation in many application fields (e.g., semiconductor processing, medical, university labs, etc.) for their simplicity and robustness to drive a wide range of loads. But they suffer low power efficiencies operating at conditions significantly different from the nominal operating point (e.g., 50 ohm (Ω) load). Unlike linear mode dc-RF power amplifiers, switched mode topologies turn semiconductors fully on and off similarly as a mechanical switch, allowing the theoretical efficiency up to 100%. With careful design and device selection, they can operate efficiently in 90% range of efficiencies for practical use in many application fields such as telecommunications. The higher efficiency operation allows them to eliminate much of the thermal management components in the system. Therefore, switched mode RF power amplifiers/inverters can achieve much smaller footprints which are favored by applications that value weight and size reduction.

In accordance with the present disclosure, a class $\Phi_2$ switched mode dc-RF power inverter topology as shown in FIG. 4D is chosen. The class $\Phi_2$ inverter uses a novel multi-resonant network ($L_F$, $L_{MR}$, $C_{MR}$, and $C_P$ in FIG. 4D) to achieve zero voltage switching (ZVS) characteristics for the single ground reference semiconductor switch. ZVS is an important attribute for switched mode dc-RF power converters as it eliminates the frequency dependent semiconductor switching losses and therefore allows efficient operations at switching frequencies up to 100 MHz. The multi-resonant network also shapes the semiconductor switch off-state voltage waveform to approximate a trapezoidal with the maximum voltage stress to be about 2 times of the input voltage, a significant reduction compared to the 3.6 times of a class E inverter, as illustrated in FIG. 4E. This allows designers to use better semiconductor devices with lower voltage ratings, which usually feature lower on-state resistance, better switching characteristics and therefore can lead to better converter efficiency. More importantly, the use of the multi-resonant network eliminates any large value choke inductors, such as in a class E converter, leaving all inductors part of the resonant network and of smaller inductance values. However, the $\Phi_2$ converter, like many other switched mode topologies, is only capable of driving a relatively small range of loads efficiently compared to their linear mode counterparts. Unfortunately, plasma (a hot ionized conducting gas) as an electrical load is notoriously difficult to drive. The voltage-current (V-I) characteristics of plasma discharges are highly nonlinear, and extraordinarily sensitive to variations of parameters and operating conditions such as gas pressure, gas flow, driving voltage and power, etc. At each operating condition, small parameter changes can result in significant electrical impedance variations, leaving it difficult to maintain efficient soft switching power converter operation. Hence, careful characterization of the plasma electrical impedance as well as design of matching networks to ensure efficient operation for plasma generation as illustrated in FIG. 4F is proposed. These procedures are detailed in the Experimental Embodiments section.

Figure 5A:
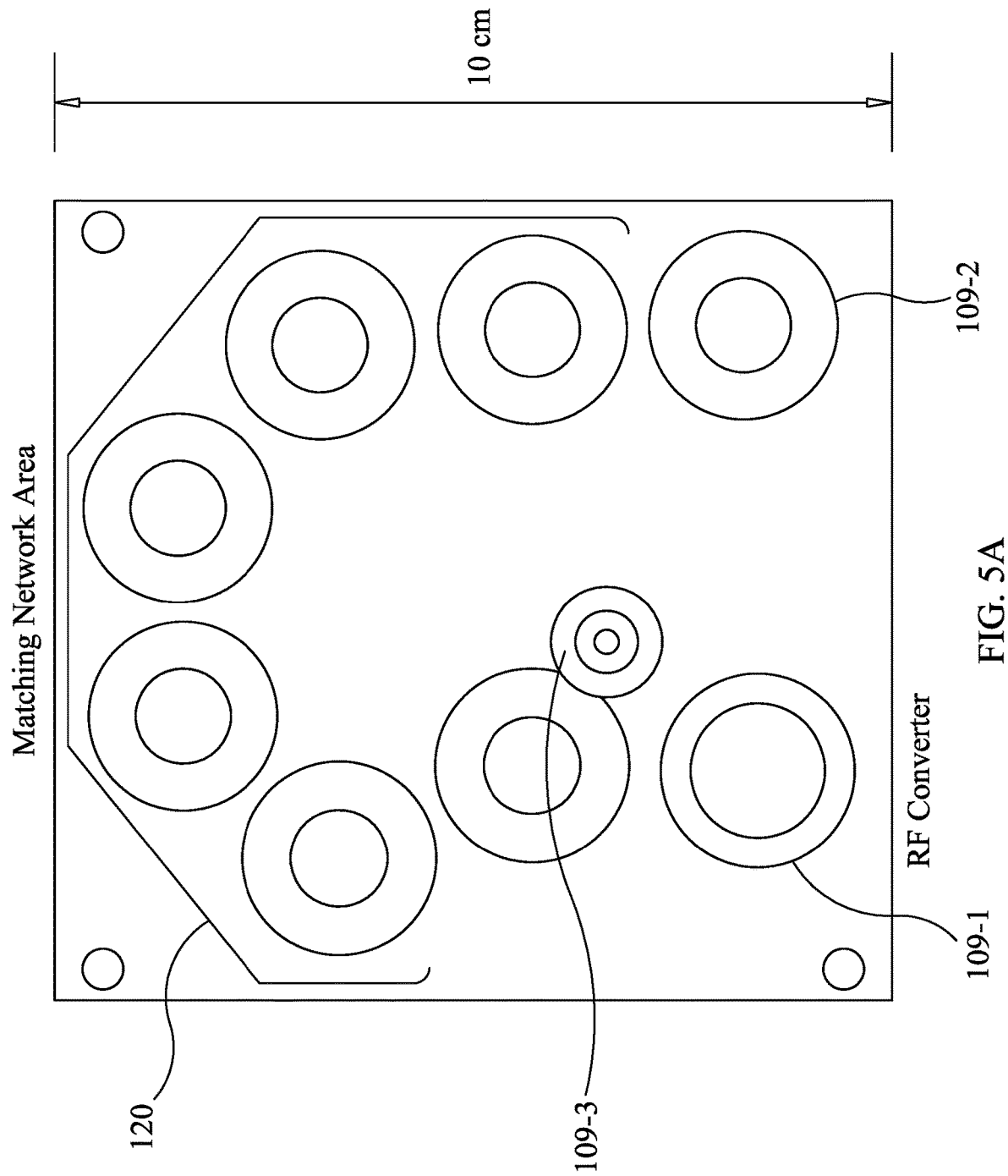
FIGS. 5A-5C illustrate aspects of an example matching network, in accordance with the present disclosure.
Figure 5B:
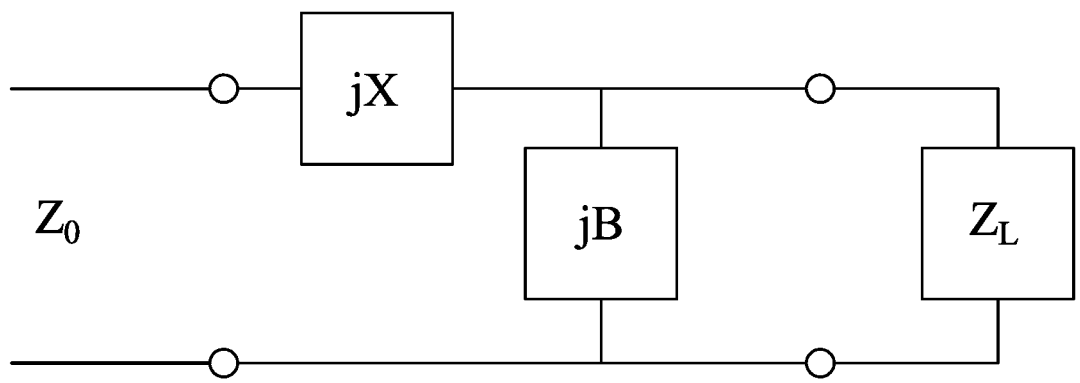
Figure 5C:
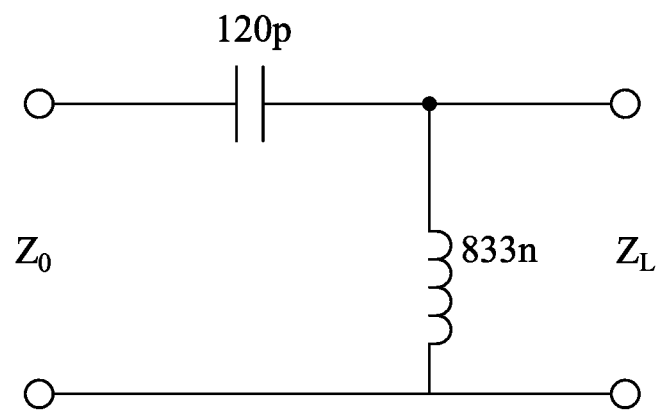

FIGS. 5A-5C illustrate aspects of an example matching network, in accordance with the present disclosure. As discussed herein, the class $\Phi_2$ converter and associated matching network 120 are implemented on two stacked 3.2 mm thickness PCBs. The switched mode dc-RF power converter such as the class $\Phi_2$ discussed herein uses resistive or slightly inductive load to maintain ZVS for efficient operation. But as indicated above, the measured impedance is highly capacitive. To transform the impedance to a resistive value, an L-shape matching network 120 as shown in FIGS. 5A-5C is utilized. The matching network performs two functions, resonant to absorb the imaginary part of the load impedance, and transform the real part of the load to a value that the power converter stage can work efficiently at designed power level. The derivation is as following, $$Z_o = Z_L \| \left(\frac{1}{jB}\right) + jX \quad (2)$$

To design the inverter to deliver $P_{plasma,OUT}$=38 W at an input VIN=14 V, according to the equation in, about 4.2Ω is needed at the inverter load.

$$R_{LOAD} = \left(\frac{4V_{IN}}{\pi\sqrt{2}}\right)^2 / P_{plasma,OUT} \quad (3)$$

So to achieve the transformation from $Z_L$=37−284j Ω to $Z_O$=4.2Ω at 13.85 MHz, the following values are calculated for a high pass L-shape matching network as shown in FIG. 5B. The primary reason to choosing a high pass design is to allow $C_M$ to replace the large blocking $C_S$ in the original class $\Phi_2$ inverter.

MORE DETAILED AND/OR EXPERIMENTAL EMBODIMENTS

Practical issues such as board fabrication and material use, MOSFET gate drive circuit, all RF connectors, etc. may not be optimized for spaceflight conditions. Component values (corresponding to FIG. 4F) are as follows: MOSFET part No.=IPD530N15N3, $L_F$=63 nH, $L_{MR}$=85 nH, $L_M$=833 nH, $C_{MR}$=390 pF, $C_P$=390 pF, $C_M$=120 pF.

To determine electrical impedance of plasma, experimental embodiments start by driving the micro-thruster to strike and maintain the plasma at intended operating conditions using an ENI A1000 linear RF power amplifier, as it is designed to drive a wide range of load. An RF coaxial current monitor (Pearson Model 6027) and a Rigol 100× voltage probe were inserted in line to measure the time domain current and voltage waveforms at the micro-thruster's input.

Another important aspect concerns the proposed electrothermal micro-thruster, which is inherently capacitive with its impedance phase close to −90 degree. It is beneficial to mitigate or prevent phase measurement error at tens of MHz range due to the probes themselves and/or difference in probe cables lengths. Hence a 50Ω RF resistor with low parasitics as a standard was used as load to carefully calibrate and de-skew the voltage and current probes before measurements.

In one example experimental embodiment, the RF power was supplied at 13.85 MHz from the ENI A1000 to the thruster's electrode while feeding 40 sccm of Ar flow, both at its designed operating conditions. Voltage and current waveforms were measured while maintaining the plasma in the thruster. Data was collected for the corresponding current and voltage waveforms of the thruster (−450V<Vout<450V) while plasma was running at designed power level of about 38 W with an estimated power inverter dc to plasma efficiency of 85% [36] ($P_{plasma,OUT}P_{DC}$× 0.85=45×0.85 W=38 W). This assumes a majority of the power is transferred at fundamental frequency, and the fundamental components of the voltage and current being also extracted (from analyzing the measurement waveform data) to determine the impedance magnitude and phase. The plasma impedance was then determined as $Z_{MEAS}=37-284j$ Ω.

In the above example, the thruster consists of an 18-20 mm long, 1.5 mm inner diameter, 3 mm outer diameter alumina tube. A 5 mm wide, 16 mm diameter, annular copper powered electrode surrounds the alumina tube at the midpoint, creating an asymmetric weakly ionized (less than 1%) capacitively coupled plasma (CCP) inside the tube.

A small vacuum chamber and a primary rotary pump were assembled to create the vacuum environment for testing the thruster. The thruster was attached to one side of the chamber flange. A vacuum gauge and a gas flow controller were used to monitor the chamber pressure (about 0.03 torr) and noble gas propellant (Ar) flow rate (about 15 sccm). The thruster had an SMA feedthrough that allows the connection of RF power from outside the chamber. To determine the electrical impedance of the plasma, the thruster was driven using an ENI A1000 linear RF power amplifier. An RF coaxial current monitor (Pearson Model 6027) and a properly de-skewed PMK 100× voltage probe were connected to measure the time domain voltage and current waveforms at the SMA feedthrough of the thruster. Careful calibration and de-skewing were performed on the voltage and current probe using a 50Ω RF load before testing as the phase of probes or difference in cable lengths could compromise the phase measurement at tens of MHz. The thruster was run at 13.8 MHz, a frequency that strikes and maintains the plasma at the designed operating power. With these conditions, the voltage and current waveforms were measured during plasma operation. The corresponding current and voltage waveforms of the thruster plasma running at 43 W showed Vout in the range of approx. −600V<Vout<.approx. 600V (and s above with period between peaks at approximately 75 ns).

After extracting the impedance magnitude and phase, a high pass L matching network was designed ($L_m$=1900 nH, $C_m$=30 pF, shown in FIG. 5C) and implemented using air core wire wound inductors and low loss NP0 ceramic capacitors to match the impedance to 50Ω resistive at 13.8 MHz. The matching network was then connected in line with the thruster and around 24Ω resistive input impedance was achieved from the combined thruster and matching network at 16 MHz. Any discrepancy of the designed matching network and experiments can be attributed to the high non-linearity of the plasma as well as the inherent parasitics that the voltage and current probes add to the system.

The $\Phi_2$ topology shown in FIG. 4D was chosen for the power inverter due to its good performance at tens of MHz and relatively low semiconductor voltage stress. The prototype was designed to deliver 45 W at an input of 40 Vdc. The designed values of components are listed in Table I below.

TABLE I

Inverter parameters

| Parameter | Value (Q) | Units |
|---|---|---|
| $f_a$ | 16 | MHz |
| MOSFET | GS66504B | |
| $L_F$ | 63 | nH |
| $L_{MR}$ | 85 | nH |
| $L_S$ | 0 | nH |
| $C_{MR}$ | 290 | pF |
| $C_S$ | 1 | nF |
| $C_P$ | 470 | pF |

Initial proof of concept inverter and matching network design were modified from the implementation of the inverter that drives an earlier version of the thruster for quick verification. FIG. 5A shows the implementation of the inverter and matching network. All the air core inductors in the inverter were formed with two 3.2 mm thickness PCB stacked vertically to cancel the axial direction flux normal to the of the toroids as described. The PCB board measures 10 cm on the side (7 mm thick) and can serve as one structural side panel of a one 10 cm cube CubeSat. A GaN-Systems 650 V (GS66504B) GaN FET was utilized in the inverter. The inverter and gate drive sections in FIG. 5A were initially tested at 16 MHz on a 50Ω RF load for inverter performance characterization. The inverter delivers 20 W with a 40 Vdc input and achieves an efficiency of 87%.

To drive the thrusters, a breakout connection was made from the inverter board to the wire wound matching network. Under the pressure and gas flow conditions described above, the plasma was maintained with the RF inverter running at 16 MHz. The inverter drew 50 W of power from the input bus at 40 Vdc. And the efficiency of the inverter stage is around 86%. Moreover, to accommodate the small power budget on CubeSats, the inverter can be pulsed at lower frequency (e.g., 1 kHz) to achieve low average input power of 2 W while maintaining the plasma.

In connection with the above example embodiment, a PCB $L_M$ design with two halves connected in series and printed on 6.4 mm FR4 PCB may be used. The board dimensions included 100 mm by 50 mm by 6.4 mm. The 6.4 mm thickness PCB was chosen to have reasonable cross section aspect ratio (close to square) for the toroids and thus to achieve better quality factors than large cross section aspect ratio on a normal 1.6 mm thickness PCB. The resulted inductance of the PCB $L_M$ was 1750 nH. And the measured quality factor of this inductor was around 135 at 13.8 MHz. Even though it was less than the 1900 nH of the wire wound $L_M$, we were able to strike plasma in the miniPR 3.0 with a $C_M$ of 34 pF.

The redesigned class $\Phi_2$ inverter had the component values listed in Table II. The inverter was re-tuned to operate efficiently at 13.8 MHz which corresponds to the nominal frequency of the thrusters. Moreover, a 150 V Si MOSFET in DPAK was used to replace the original GaN FET with the consideration for better cooling in future in-vacuum testing. The inverter was first tested with a 25Ω resistor load at an input 14 V which is lower than the original 40 V and thus more realistic on a CubeSat's relatively low voltage bus. The inverter delivers 6 W output power with an efficiency of 85%. The inverter was then connected with the PCB matching network to the input of the thruster. At an input of 14 V, the inverter with matching network had an input power of 15 W for continuous operation. To accommodate the CubeSat's low power budget, it was also able to operate under pulsed condition to below 1 W while maintain the plasma running. The MOSET drain voltage of the inverter while the plasma running was plotted in with peak voltage approaching 45 volts (e.g., each 0.08 μsecs).

TABLE II

Re-tuned inverter parameters

| Parameter | Value (Q) | Units |
|---|---|---|
| $f_a$ | 13.8 | MHz |
| MOSFET | IPD530N15N3 | |
| $L_F$ | 63 | nH |
| $L_{MR}$ | 85 | nH |
| $L_S$ | 0 | nH |
| $C_{MR}$ | 390 | pF |

TABLE II-continued

Re-tuned inverter parameters

| Parameter | Value (Q) | Units |
|---|---|---|
| $C_S$ | 1 | nF |
| $C_P$ | 390 | pF |

A basic schematic of the low-cost propellant consists of five major components: the argon gas canister, a custom-made adapter, an upstream pressure transducer (l'Essor Francais Electronique PST867), a regulator (Beswick Engineering PRD3HP-2NI-3-E), and a proportional valve (iQ Valves SS-9600409-1032). Gas enters the custom adapter from either the gas canister or a laboratory gas line through the tapped hole marked 'A'. The pressure of the gas is then measured by the upstream pressure transducer. The gas pressure is then regulated down to a set pressure between 34.47 and 206.8 kPas (5 and 30 psig). Finally the proportional valve is used to control the gas flow on through the plenum cavity of the thruster.

Terms to exemplify orientation, such as upper/lower, front-end/back-end, left/right, top/bottom and above/below, may be used herein to refer to relative positions of elements as shown in the figures. It should be understood that the terminology is used for notational convenience only and that in actual use the disclosed structures may be oriented different from the orientation shown in the figures. Thus, the terms should not be construed in a limiting manner.

The skilled artisan would recognize that various terminology as used in the Specification (including claims) connote a plain meaning in the art unless otherwise indicated. As examples, the Specification describes and/or illustrates aspects useful for implementing the claimed disclosure by way of various circuits or circuitry some of which may be illustrated as or using terms such as blocks, modules, device, system, unit, controller, sequencer, filter and/or other circuit-type depictions. Such circuits or circuitry are used together with other elements (e.g., computer processors known for controlling, via the above characterized circuitry, the integrated thrusters) to exemplify how certain embodiments may be carried out in the form or structures, steps, functions, operations, activities, etc. For example, in certain of the above-discussed embodiments, one or more modules are discrete logic circuits or programmable logic circuits configured and arranged for implementing these operations/activities, as may be carried out in the approaches shown in each of the above Figures. In certain embodiments, such a programmable circuit is one or more computer circuits, including memory circuitry for storing and accessing a program to be executed as a set (or sets) of instructions (and/or to be used as configuration data to define how the programmable circuit is to perform), and an algorithm or process implemented by a computer (or digital signal processor circuit) in software (e.g., to perform the related steps, functions, operations, and activities which might be understood or discussed in connection with the above-discussed embodiments. Depending on the application, the instructions (and/or configuration data) can be configured for implementation in logic circuitry, with the instructions (whether characterized in the form of object code, firmware or software) stored in and accessible from a memory (circuit). As another example, where the Specification may make reference to a "first [type of structure]", a "second [type of structure]", etc., where the [type of structure] might be replaced with terms such as ["circuit", "circuitry" and others], the adjectives "first" and "second" are not used to connote any description of the structure or to provide any substantive meaning; rather, such adjectives are merely used for English-language antecedence to differentiate one such similarly-named structure from another similarly-named structure (e.g., "first circuit configured to convert . . . " is interpreted as "circuit configured to convert . . . ").

Based upon the above discussion and illustrations, those skilled in the art will readily recognize that various modifications and changes may be made to the various embodiments without strictly following the exemplary embodiments and applications illustrated and described herein. For example, methods as exemplified in the Figures may involve steps carried out in various orders, with one or more aspects of the embodiments herein retained, or may involve fewer or more steps. Such modifications do not depart from the true spirit and scope of various aspects of the disclosure, including aspects set forth in the claims.

What is claimed is:

1. An apparatus comprising:
a power converter, including a plurality of inductors and other electrical components, to provide operating power to load terminals;
a printed circuit board (PCB) including at least one layer at which the other electrical components are secured, wherein a first one and a second one of the plurality of inductors are configured and formed as printed circuit inductor traces of the PCB, the PCB including a passage therethrough from a first side of the PCB to an opposing second side of the PCB; and
an electric-propulsion thruster, positioned through and secured through the passage, wherein in response to application of the operating power at the load terminals, the electric-propulsion thruster is to generate a choked flow into a plasma cavity of the electric-propulsion thruster to provide thrust.

2. The apparatus of claim 1, wherein the electric-propulsion thruster is at least one of: an electro-thermal thruster; an electro-static thruster; and an electro-magnetic thruster.

3. The apparatus of claim 1, wherein the electric-propulsion thruster is an electro-thermal plasma-ion thruster including a propellant subsystem to feed gas to the electro-thermal plasma-ion thruster, wherein the PCB and the propellant subsystem are secured to or integrated with said at least one structurally-rigid housing side wall of the electro-thermal plasma-ion thruster.

4. The apparatus of claim 1, further including another electric-propulsion thruster and another PCB, each PCB being common to a housing.

5. The apparatus of claim 1, wherein the apparatus is a cubically-shaped satellite, and further including another electric-propulsion thruster and another PCB, each PCB being common to a housing and wherein the plurality of inductors includes air core inductors.

6. The apparatus of claim 1, wherein said PCB is included among six housing side walls, and wherein the apparatus further includes another electric-propulsion thruster and another PCB.

7. The apparatus of claim 1, wherein the power converter is configured and arranged with the plurality of inductors and other electrical components to cause, during operation, an output signal pulsing between 10 MHz and 30 MHz.

8. The apparatus of claim 1, wherein the electric-propulsion thruster includes at least one component of a propellant subsystem that is configured to feed propellant to the electric-propulsion thruster and that is secured to at least one side wall of the electric-propulsion thruster, and wherein the electric-propulsion thruster is offset from a center axis of the PCB.

9. The apparatus of claim 1, further including a platform with dimensions not greater than 10 cm cube.

10. The apparatus of claim 9, wherein the PCB forms at least part of at least one side of the platform.

11. An apparatus comprising:
at least one power converter, including at least one set of inductors and other electrical components, to provide operating power to at least one set of load terminals;
a first printed circuit board (PCB) and a second PCB, each including at least one layer at which said other electrical components are secured, wherein said at least one set of inductors includes one or more inductors provided as one or more printed conductive traces of the first PCB and the second PCB, wherein the first PCB and the second PCB are stacked one on top of the other so as to form a wall, the wall having a passage therethrough that passes through both the first PCB and the second PCB from a first side of the wall to an opposing second side of the wall; and
an electric-propulsion thruster positioned through and secured through the passage, wherein in response to application of the operating power at the at least one set of load terminals, the electric-propulsion thruster is to provide thrust to propel the apparatus.

12. The apparatus of claim 11, wherein the electric-propulsion thruster is an electro-thermal plasma-ion thruster.

13. The apparatus of claim 12, wherein the wall is part of a platform, the platform being configured and arranged for a microsatellite including each of the first PCB and the second PCB, wherein each of the first PCB and the second PCB has a maximum dimension of less than 15 cm for height and for length.

14. The apparatus of claim 11, wherein each of the at least one set of inductors is an air core inductor, wherein each of the first PCB and the second PCB has dimensions ranging from: 0.2 mm to 20 mm in thickness, 5 cm to 15 cm in height, and 5 cm to 30 cm in length.

15. The apparatus of claim 11, wherein the at least one power converter is to provide an output signal pulsing beyond 10 MHz.

16. A method comprising:
providing: a power converter, including a printed circuit board (PCB) at which a plurality of inductors and other electrical components are located and through which a passage is defined from a first side of the PCB to an opposing side of the PCB,
an electric-propulsion thruster positioned through and secured through the passage,
a housing comprising a plurality of housing side walls, and
a propellant subsystem within a cavity defined by the plurality of housing side walls including at least one housing side wall among the plurality of housing side walls at which the PCB is situated; and
causing operating power to be provided to the electric-propulsion thruster, and propellant to be provided to the electric-propulsion thruster from the propellant subsystem, thereby generating thrust via the electric-propulsion thruster.

17. The method of claim 16, wherein the housing is cubically-shaped and configured for a microsatellite and wherein said plurality of housing side walls comprise at least in part respective walls of the microsatellite.

18. The method of claim 17, wherein causing the operating power to be provided includes pulsing an output signal at load terminals of the power converter with at least one frequency in a range from 10 MHz to 30 MHz, wherein the plurality of inductors includes an air core inductor, and included among the other electrical components is a capacitor.

19. The method of claim 16, wherein said power converter includes a component that is secured on or as part of the PCB, in a manner that is offset from a center axis of the PCB, wherein a thickness, a width and a length of the housing is each less than or equal to 25 cm.

20. The method of claim 16, wherein the plurality of inductors include at least one air core toroidal inductor.

21. An apparatus comprising:
a plurality of air core inductors;
at least one printed circuit board (PCB) including at least one layer at which certain electrical components and printed circuit inductor traces, for the plurality of air core inductors, are secured, wherein each of the plurality of air core inductors is an air core toroidal inductor that is formed from printed circuit inductor traces of the PCB along a planar surface of said at least one PCB, the at least one PCB including a passage therethrough from a first side of the at least one PCB to an opposing second side of the at least one PCB;
an electro-thermal plasma-ion thruster to propel the apparatus in response to a change in electrical energy to at least one set of load terminals;
at least one power converter, to provide operating power to the at least one set of load terminals, said at least one power converter including a switched mode direct-current radio-frequency power inverter integrated with the electro-thermal plasma-ion thruster, and including the plurality of air core inductors and the certain electrical components; and
a housing including a first structurally-rigid housing side wall section and a second structurally-rigid housing side wall section which in part comprise outer-perimeter walls of a housing cavity, wherein the at least one PCB forms part of or is secured to the outer-perimeter walls,
wherein the electro-thermal plasma-ion thruster is positioned through and secured through the passage such that a portion of the electro-thermal plasma-ion thruster extends into the housing cavity, wherein in response to application of the operating power at the at least one set of load terminals, the electro-thermal plasma-ion thruster is to provide thrust to propel the apparatus.

22. The apparatus of claim 21, wherein each of the at least one PCB has a maximum dimension of less than 15 cm for each of a height of the at least one PCB and a length of the at least one PCB.

* * * * *